Figure 3:
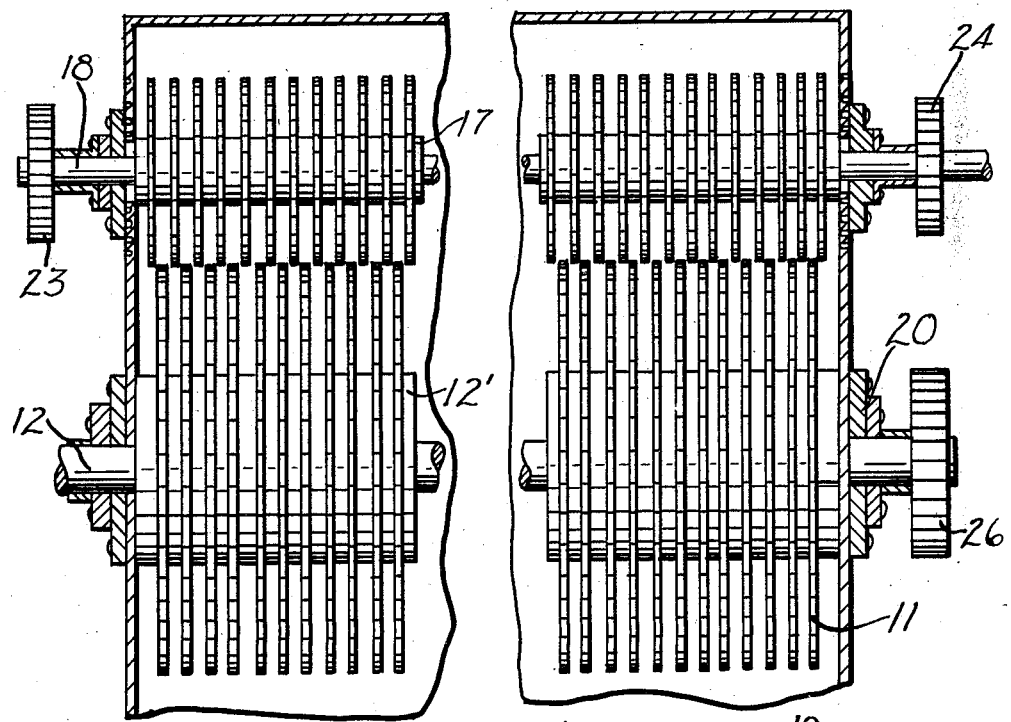

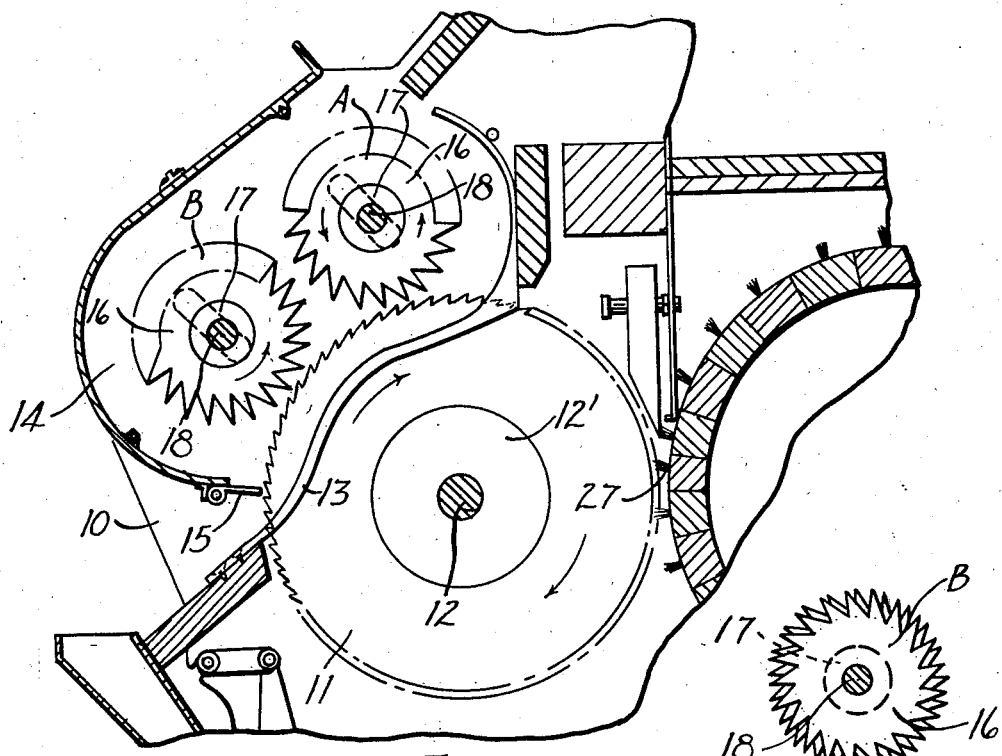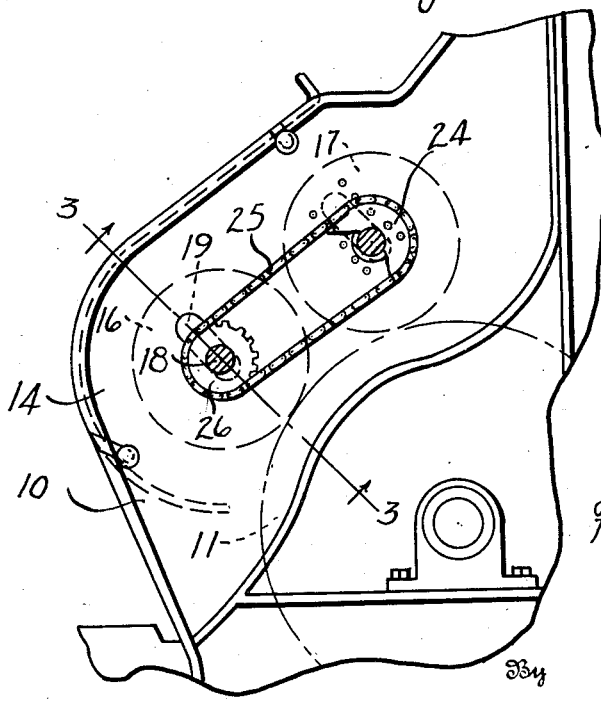

Aug. 4, 1936.   K. B. CUMPSTON ET AL   2,050,164
METHOD OF AND MEANS FOR REMOVING LINT FROM COTTON SEEDS
Filed Feb. 4, 1935   2 Sheets-Sheet 2

Inventors
Kermit B. Cumpston
Pressley E. Hopper

By Jack A. Ashley
Attorney

Patented Aug. 4, 1936

2,050,164

UNITED STATES PATENT OFFICE 2,050,164

METHOD OF AND MEANS FOR REMOVING LINT FROM COTTON SEEDS

Kermit B. Cumpston, Blooming Grove, and Pressley E. Hopper, Dallas, Tex., assignors of one-fourth to J. J. Eckford, one-fourth to Jack A. Schley, both of Dallas, Tex., and one-half to Kermit B. Cumpston, Blooming Grove, Tex.

Application February 4, 1935, Serial No. 4,782

6 Claims. (Cl. 19—57)

This invention has to do with a method of and means for removing lint from cotton seeds, either in a gin or a linter gin.

The invention is complementary to the invention set forth in co-pending application Serial No. 666,080, filed April 14, 1933. In both inventions the retarding of the cotton seeds in the proximity of the teeth of the ginning saws, whereby auxiliary ginning is performed, is involved. However, in the co-pending application the teeth of the auxiliary saws are set forth as projecting between the teeth of the ginning saws.

One object of the present invention is to provide a gin or linter gin having in its roll box one or more auxiliary saw cylinders, each having its teeth rotating in close proximity to the teeth of the gin saws, but not entering between the teeth of the latter, whereby the orbits, in which the points of the teeth of the ginning saws and the points of the teeth of the auxiliary saws travel, do not overlap. The advantage of such an arrangement is that more space is provided between the crotches of the ginning saw teeth and the crotches of the auxiliary saw teeth, and thus the seeds are not as likely to be hulled or cut and are more readily freed from the saw teeth.

Another object of the invention is to provide a cotton ginning machine wherein a pair of auxiliary saw cylinders are mounted in the roll box, one above the other, and co-acting with the teeth of the ginning saws at spaced elevations thereon; the lower cylinder, being rotated at a higher peripheral speed than the peripheral speed of the upper saw cylinder, will carry an increased volume of seeds to the space between said auxiliary cylinders which is in the vicinity of the ginning saw teeth. These seeds being carried to this point faster than they can escape from beneath the upper cylinder, keeps this space or area filled with seeds, even though many seeds fall between the ginning saws and pass down the rib surfaces. Such an arrangement increases the ginning capacity, particularly where the auxiliary saws have their teeth rotating upwardly and away from the direction of travel of the ginning saw teeth.

Still another object of the invention is to provide adjustments for the auxiliary saw cylinders, whereby each cylinder may be adjusted toward and from the ginning saws, thus making it possible to move the auxiliary saw cylinders inwardly so that the points of their teeth will pass in close proximity to the points of the teeth of the ginning saws, or between them, as in my co-pending application, or outwardly so as to vary the spacing between the points of the teeth of the ginning saws and the points of the teeth of the auxiliary saws.

A construction designed to carry out the invention will be hereinafter described, together with other features of the invention.

Figure 5:
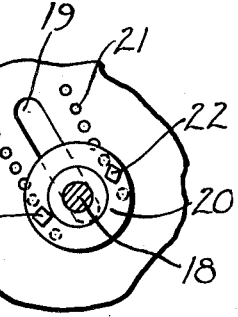
Figure 4:
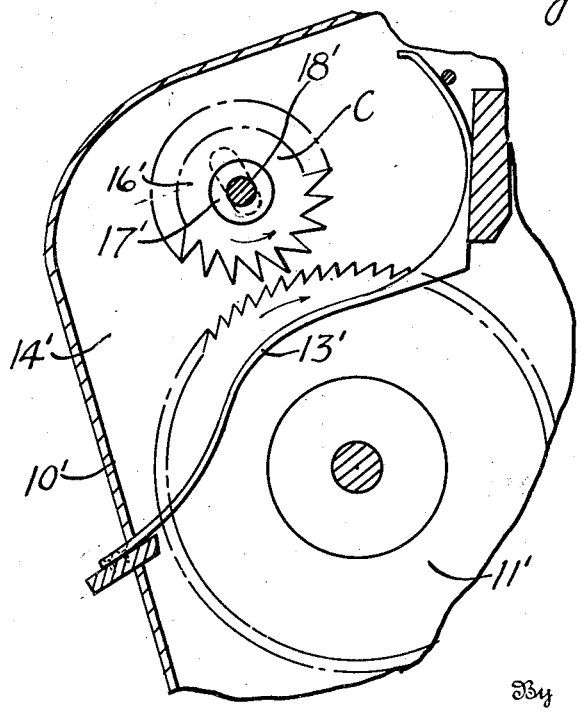

The invention will be more readily understood from a reading of the following specification and by reference to the accompanying drawings, in which an example of the invention is shown, and wherein:

Figure 1 is a partial transverse vertical sectional view of a cotton linter gin having auxiliary saw cylinders mounted in the roll box thereof, constructed in accordance with the invention, Figure 2 is a partial end elevation of the same, Figure 3 is a longitudinal cross-sectional view taken on the line 3—3 of Figure 2, Figure 4 is a view similar to Figure 1, showing a single auxiliary saw cylinder mounted in the roll box of a cotton gin, Figure 5 is a detail of the adjustable mounting for the auxiliary saw cylinder, for either a cotton gin or a linter gin, Figure 6 is a view partly in elevation, and partly in section, showing another method of mounting the auxiliary saws, and Figure 7 is a vertical sectional view taken on line 7—7 of Figure 6.

In the drawings the numeral 10 designates the frame of an ordinary cotton linter. The term "linter" is commonly employed and will be so used through this specification. The usual ginning saws 11 are mounted on the drive shaft 12, which also carries the space blocks 12'. This structure is sometimes referred to as the ginning saw cylinder. The saws 12 project between the usual ribs 13.

In carrying out the invention in the construction of a linter, it is preferable to provide two auxiliary saw cylinders A and B, which make it necessary to construct an elongated roll box 14 having a lambrequin 15 at its lower end. This elongated box not only accommodates a pair of auxiliary saw cylinders, but it causes a greater portion of the ginning saw cylinder to be exposed in the roll box, thus providing more ginning teeth for action in said box. Each auxiliary saw cylinder comprises saws 16 separated by annular space blocks 17 and mounted on shafts 18. It will be noted that the cylinders A and B are considerably less in diameter than the ginning saw cylinder, the exact sizes, however, being subject to variation.

An important feature is the relative sizes of the teeth of the ginning saws. While it is possible to have all of the teeth approximately the same size, it has been found that more efficiency is obtained where the teeth of the auxiliary saws are considerably larger than the teeth of the ginning saws. Very good results have been obtained by making the ratio between the teeth of each auxiliary saw and each ginning saw from three to one to eight to one, and this, of course, is subject to variation. Further, highly satisfactory results have been obtained by making the teeth of the upper cylinder A coarser than the teeth of the lower cylinder B. As an example, effective ginning has been accomplished where the ratio between the teeth of the cylinder A and the ginning saw cylinder is four to one, while the ratio between the teeth of the lower cylinder B and the teeth of the ginning saw cylinder is five to one.

The scope of this invention necessarily covers the rotation of the auxiliary saw teeth in orbits outside of the orbit of rotation of the teeth of the ginning saws, so that there is no intermeshing or overlapping of the teeth. However, the teeth of the auxiliary saws may travel in close proximity to the teeth of the ginning saws. In practice, the points of the teeth of the auxiliary saw cylinders have been spaced from positions in which they just cleared the points of the ginning saw teeth out to positions where there was a space of approximately one inch therebetween. No set rule can be established, because the operator must determine the adjustments in accordance with the ginning conditions and the seed which is being handled. In order that these adjustments may be readily made, each shaft 18 extends through a slot 19 in the ends of the frame 10 and is journaled in bearing boxes 20. On each side of each slot rows of bolt holes 21 are provided for receiving the screw-threaded ends of machine bolts 22, whereby the bearing boxes may be fastened in adjusted positions, as is shown in detail in Figure 5.

The ginning saws 11 are, of course, positively driven in the usual manner. The auxiliary saw cylinders A and B are not floats, but are mechanically driven saw cylinders. In Figure 3, the shaft 18 of the upper cylinder A is provided with a pulley 23 at one end, whereby the cylinder may be driven in any suitable manner. On its opposite end the said shaft is provided with a sprocket 24. As shown in Figure 2, this sprocket drives an endless chain 25, which in turn drives a sprocket 26 fastened on the shaft 18 of the lower saw cylinder B. It will be noted that the sprocket 26 is less in diameter than the upper sprocket and, therefore, the lower cylinder B will be driven at a faster rate of peripheral speed than the upper cylinder. It will be noted further that the saw cylinders A and B are driven in the same direction and by referring to Figure 1, this direction will be found to be counterclockwise. The gin saws 11 are driven clockwise and this causes the teeth of the auxiliary cylinders to move in the same direction, which is upwardly at their adjacent points.

However, it is important to the success of the invention that the cylinders A and B be rotated at a slower rate of peripheral speed than that at which the ginning saw cylinder is rotated. The purpose of this is to retard the rolls formed by the auxiliary saws so that the faster moving teeth of the ginning saws may remove the lint from the seeds. By moving all saws upwardly or in the same general direction through the ginning zones, the seeds are easily dislodged from the teeth of the auxiliary saws. This is another reason for making the teeth of the auxiliary saws considerably larger than the teeth of the ginning saws.

It will be observed that the saw cylinders A and B are comparatively close and this will cause contact between the rolls of seeds formed by each auxiliary cylinder. The saws being driven in the same direction, their adjacent teeth will pass in opposite directions, which will serve to agitate the seeds on the surfaces of the rolls, causing them to constantly change their positions and thus present fresh lint to the teeth of the ginning saws, when carried into contact therewith. From Figure 3 it will be noted that the auxiliary saw cylinders are disposed relatively between the ginning saws 11 and not opposite the teeth thereof. This arrangement permits the seeds to pass between the rows of saws, thereby contributing a cushioning effect, which avoids breaking or hulling. The spacing of the auxiliary cylinders from the ginning saws further enhances this cushioning and prevents cutting and hulling.

Most of the lint is removed from the seeds in the roll formed around the top saw cylinder A. The seeds which have most of their lint removed will naturally fall or move downward in the roll box so that by revolving the lower cylinder B at a faster peripheral speed, these seeds will be more readily picked up and not only formed into a roll, but moved upwardly to the space between the auxiliary saw cylinders and pressed against the teeth of the ginning saws. By this arrangement, nearly the entire portion of the periphery of the ginning saw cylinder, which is exposed in the roll box 14, becomes active and its teeth function to remove lint from the two rolls carried by the cylinders A and B, as well as from the seeds massed between such rolls in the vicinity of the teeth of the gin saws. Actual tests have shown that the effective ginning area is increased to about three times that which is created by a single saw cylinder.

The teeth of the saws 11 being cleaned by the brush 27, will be free from lint as they enter the bottom of the roll box 14 and they will attack the shorter fibres of the lower roll and effectually remove them. However, these gin saw teeth will not be completely loaded and will still have sufficient capacity to remove the longer fibers from the upper roll.

Considerable advantage has been found by keeping the teeth of the auxiliary saw cylinders A and B out of the zone or path of the teeth of the ginning saws 11. The more the teeth of the auxiliary saws intermesh with the teeth of the gin saw cylinders, the closer the saw cylinders are brought together and consequently the greater the choking or clogging. By spacing the cylinders apart, the seeds are given an opportunity to escape from the teeth without being hulled or cut. Further, a softer roll can be run and better cushioning is had. This reduces the shale and provides better seed. The seeds are, of course, carried against the ribs 13 and the lint removed in the usual manner. However, the lint which is previously removed by the auxiliary saw cylinders A and B greatly increases the capacity of the linter. It has been advantageous to provide a smooth polished surface on the annular spacer blocks 17 which separate the auxiliary saws. These blocks are also constructed of a comparatively small diameter. This aids in keeping the cotton from "coring" around the auxiliary saws and the reduced diameter affords further cushioning effect.

In Figure 4, I have shown a portion 10' of the frame of an ordinary cotton gin having ginning saws 11' mounted therein and projecting into a roll box 14' through the usual ribs 13'. A single saw cylinder C is mounted in this box on a shaft 18' and includes saws 16' separated by space blocks 17'. Because the lint is longer on cotton seeds which are fed to a gin, only one auxiliary cylinder is necessary. The purpose of this cylinder, like that of the cylinders A and B, is to retard the roll so that the ginning saws may remove lint prior to ginning at the ribs. The ginning saws are driven faster than the auxiliary saw cylinder and the sizes of the teeth are governed largely by the character of cotton to be ginned. In Figures 6 and 7, I have shown the saws of the auxiliary cylinders mounted in staggered relation to each other. That is, each saw is rotated out of alinement with the next saw adjacent thereto, one half the distance of the pitch of the teeth. This provides for a more efficient co-action of said auxiliary cylinder with the ginning saws and aids it keeping the roll smooth. Also, jumping or jerking during operation is eliminated. It is pointed out, however, that this particular mounting of the auxiliary saws is not essential to the invention, as very good results may be obtained by mounting the auxiliary saws in direct alinement. It is not necessary that an auxiliary saw be provided for each gin saw; therefore, the number of saws in each saw cylinder may vary.

What I claim and desire to secure by Letters Patent is:

1. In a cotton lint fibre removing device, the combination with the ribs, ginning saws, and roll box, of an auxiliary revolving saw cylinder mounted in the roll box with its teeth adjacent the teeth of the ginning saws but out of the zone thereof, and means for positively rotating the auxiliary saw cylinder at a slower rate of peripheral speed than the peripheral speed of rotation of the ginning saws to retard the cotton seeds and to gin them with the teeth of the ginning saws prior to ginning at the rib, the saws of the auxiliary saw cylinder being mounted so that the teeth of one saw are disposed in staggered relation to the teeth of the next adjacent saw, whereby jumping and jerking of the roll is prevented and the periphery of the roll is made more smooth.

2. In a cotton lint fibre removing device, the combination with the ribs, ginning saws, and roll box, of a plurality of auxiliary revolving saw cylinders mounted one above the other in said roll box and having ginning teeth co-acting with the teeth of the ginning saws at spaced upright points on said ginning saws to remove lint fibres from the cotton seeds prior to the ginning at the ribs, the auxiliary saw cylinders being mounted with their teeth rotating in orbits outwardly of the orbits of rotation of the teeth of the ginning saws, whereby seeds are ginned at two elevations in the roll box prior to ginning at the ribs and without being cut by the saw teeth.

3. In a cotton lint fibre removing device, the combination with the ribs, ginning saws, and roll box, of a plurality of auxiliary revolving saw cylinders mounted one above the other in said roll box and having ginning teeth co-acting with the teeth of the ginning saws at spaced upright points on said ginning saws to remove lint fibres from the cotton seeds prior to the ginning at the ribs, the auxiliary saw cylinders being mounted with their teeth rotating in orbits outwardly of the orbits of rotation of the teeth of the ginning saws, whereby seeds are ginned at two elevations in the roll box prior to ginning at the ribs and without being cut by the saw teeth, the teeth of one auxiliary saw cylinder being coarser than the teeth of the other auxiliary saw cylinder.

4. In a cotton lint fibre removing device, the combination with the ribs, ginning saws, and roll box, of a plurality of auxiliary revolving saw cylinders mounted one above the other in said roll box and having large teeth co-acting with the teeth of the ginning saws at spaced upright points on said ginning saws to remove lint fibres from the cotton seeds prior to the ginning at the ribs, the auxiliary saw cylinders being mounted with their teeth rotating in orbits outwardly of the orbits of rotation of the teeth of the ginning saws, whereby seeds are ginned at two elevations in the roll box prior to ginning at the ribs and without being cut by the saw teeth.

5. In a cotton lint fibre removing device, the combination with the ribs, ginning saws, and roll box, of an auxiliary revolving saw cylinder mounted in the roll box with its teeth adjacent the teeth of the ginning saws but out of the zone thereof, the teeth of the auxiliary cylinder being considerably larger than the teeth of the ginning saws so as to agitate, receive and readily deliver cotton seeds to the zone of ginning saw teeth, the backs of the auxiliary teeth acting to retard the seeds for more effective ginning, and means for positively rotating the auxiliary saw cylinder at a slower rate of peripheral speed than the peripheral speed of rotation of the ginning saws, the teeth of all the saws passing in the same direction through the ginning zone between the ginning saws and the auxiliary saws.

6. The method of removing lint fibre from cotton seeds which consists, in feeding the seeds into a roll box having ginning saws projecting thereinto from the ribs, forming said seeds into a roll and rotating said roll at a slower peripheral speed than the peripheral speed of the ginning saws to retard the movement of said seeds with relation to the rotation of the teeth of said ginning saws, passing the cotton seeds between the teeth of the ginning saws and the teeth of an auxiliary toothed cylinder while the teeth of said auxiliary cylinder are out of the zone of the teeth of the ginning saws and are passing in the same direction as the teeth of the ginning saws, whereby an advanced stripping of the lint fibres is accomplished without carding the lint and without forcing the seeds into the crotches of the ginning saws and also without cutting said seeds, and then carrying said seeds into contact with the ribs and removing additional lint fibres therefrom by the ginning saws.

KERMIT B. CUMPSTON.
PRESSLEY E. HOPPER.